United States Patent [19]

Sideserf et al.

[11] Patent Number: 5,257,378
[45] Date of Patent: Oct. 26, 1993

[54] NETWORK COMPUTER WORKSTATION WITH INITIAL PROGRAM LOAD CONTROL

[75] Inventors: Robert A. Sideserf, Eastleigh; Dirk W. H. Heintze, Winchester, both of United Kingdom

[73] Assignee: International Business Machines Corp., Armonk, N.Y.

[21] Appl. No.: 733,904

[22] Filed: Jul. 22, 1991

[30] Foreign Application Priority Data

Nov. 16, 1990 [GB] United Kingdom ............... 90310280

[51] Int. Cl.⁵ ............................................ G06F 15/00
[52] U.S. Cl. ..................... 395/700; 364/221; 364/228.4; 364/242.95
[58] Field of Search ............... 395/650, 575, 700, 400; 359/118; 371/11.3

[56] References Cited

U.S. PATENT DOCUMENTS

| | | | |
|---|---|---|---|
| 4,639,852 | 1/1987 | Motomiya | 395/650 |
| 4,807,119 | 2/1989 | Suga | 395/400 |
| 4,907,150 | 3/1990 | Arroyo et al. | 395/575 |
| 5,065,312 | 11/1991 | Bruckert et al. | 395/575 |
| 5,150,246 | 9/1992 | Kimball et al. | 359/118 |
| 5,153,881 | 10/1992 | Bruckert et al. | 371/11.3 |

Primary Examiner—Kevin A. Kriess
Assistant Examiner—Kevin Spivak
Attorney, Agent, or Firm—Daniel E. McConnell

[57] ABSTRACT

A computer workstation 10 intended for use in a computer network 30 (e.g. a LAN), has initialization control logic which, on system power on, interrogates an IPL determinator 45 held in non-volatile read/write storage (e.g. in CMOS) to determine a source of IPL control logic and sets 51, at a predetermined location within a reserved data area of the workstation RAM, an IPL source indicator. The initialization control logic then passes control to the IPL control logic. This causes initial programs to be loaded into the workstation RAM from the IPL source. The IPL source indicator, which is preferably held in an extended BIOS data area can be used by applications running in the workstation's working memory or on a server of a network to which the workstation is connected, to check on the IPL source used. Even if the IPL determinator is changed in preparation for a subsequent session, the IPL indicator will reliably reflect the source of IPL for the current session.

12 Claims, 3 Drawing Sheets

NETWORK COMPUTER WORKSTATION WITH INITIAL PROGRAM LOAD CONTROL

FIELD AND BACKGROUND OF DISCLOSURE

The present invention relates to a computer workstation, preferably for use with a computer network such as a Local Area Network (LAN) and to a computer network incorporating such a workstation. The invention relates particularly to enabling initial program load into the working memory of such a workstation.

With current technology, the main working memory of a computer workstation such as a personal computer is volatile. In other words, the memory does not retain the information stored therein when the computer is turned off. As a result of this, one of the first operations to be performed when a computer is turned on is to load initial programs into the working memory to provide the basic tools and utilities which define the operations of the computer workstation. Such initial programs include the Basic Input/Output System (BIOS), the operating system for the computer and particular applications defined by initialization control information.

In early personal computers, the initial programs were loaded into the memory from a cassette tape. However, in more recent personal computers, the initial program load (IPL) occurs from a diskette drive, either from a floppy disk (usually called the "A" drive) or from a fixed, or hard disk (usually called the "C" drive). The initialization control information which causes the IPL comprises Power On Self Test (POST) code, IPL control logic (often termed the boot record) and control data. The POST code can be stored in read only memory, or it can, at least in part, be hardwired in the computer. When the computer is powered up, the POST code tests the status of the computer subsystems and then passes control to the boot record, which usually held on a diskette medium in a stand alone computer. The control data, which is used by the POST and boot record, can be stored in non-volatile read/write memory such as CMOS memory.

In a conventional stand alone personal computer, the POST code interrogates the floppy disk drive to test whether the drive contains a bootable diskette (i.e. whether a diskette is present and whether a valid boot record is held thereon). If it does, then the boot record on the diskette is used to control the initialization of the system. If there is not a bootable diskette in the floppy disk drive, then POST reverts to the hard disk drive for the boot record. In either case, the boot record causes the loading the initial programs into the personal computer's working memory from the "A" or "C" disk as appropriate. If no boot record is found in either source, control reverts to a BASIC ROM module in the personal computer.

If a personal computer workstation is provided with a suitable adapter and connected to a computer network such as a LAN there can be another potential source for the IPL operation. Indeed, in the case of a medialess workstation (i.e. a personal computer without diskette or tape drives) connected to a LAN by means of a LAN adapter, the only source of IPL is the LAN itself. In some cases it may be possible to upgrade a medialess personal computer to include a floppy or fixed diskette drive. There is a need, therefore for a secure mechanism for determining the source of an IPL for personal computer workstation which is suitable for or may be adapted to work with a LAN or other network.

A disclosure, entitled "Dual Function ROM that Controls the Initial Program Load (IPL)", published in International Technology Disclosures (ITD), Vol. 7, No. 12, 25 December 1989 as disclosure number 128901, describes a process which allows IPL in a personal computer from an internal diskette medium, or alternatively from a local area network server or other communications medium. Decision making paths and set-up code are provided in the routines of ROM control microcode for determining the IPL source. A non-volatile memory in the computer contains option and set-up information including a Remote IPL (RIPL) Enable Flag which can be set by the operator of the computer. When the computer is powered up, a Power On Self Test (POST) program stored in read only memory interrogates this RIPL Enable Flag and tests for the presence of any local and/or remote IPL devices, and for the status of all computer subsystems. The IPL operations occur in accordance with the results of the tests performed by the POST program. The POST program contains default information which enables a medialess personal computer to be initialized.

The ITD disclosure describes a process which allows IPL in a personal computer or workstation from an internal diskette medium, or alternatively from a local area network server or other communications medium. It appears that the process is also applicable where the personal computer is medialess. However, it does not describe how the IPL operation can be made secure. There is a need in a network environment, especially a LAN environment, to ensure that the default IPL is a remote IPL.

BRIEF DISCLOSURE OF THE INVENTION

In accordance with a first aspect of the present invention, there is provided a computer workstation, preferably for use with a computer network, the computer workstation comprising an initial program load (IPL) determinator held at a predetermined location in non-volatile read/write storage for indicating the source of initial program load control logic and permanently resident initialization control logic which is operable on power on, to interrogate the IPL determinator to determine the source of IPL control logic, to set, at a predetermined location within a reserved data area of the workstation RAM, an IPL source indicator and to pass control to the IPL control logic for causing initial programs to be loaded into the workstation RAM from the IPL source.

The provision of the IPL source indicator means that after initialization, applications running in the workstation's working memory or on a server of a network to which the workstation is connected, can check on the source of the IPL control logic (or boot record) by interrogating the IPL indicator flag within the reserved data area. Thus, even if the IPL determinator flag is changed in preparation for a subsequent session, the indicator will reliably reflect the source of IPL for the current session.

In a preferred embodiment, the initialization control logic is in the form of Power On Self Test (POST) code held in Read Only Memory.

The present invention is particularly adapted for use with a workstation which can be adapted for connection to a computer network by the provision of a network adapter with remote IPL capability. In such a case, the initialization control logic preferably sets the IPL source indicator only when a network adapter with remote IPL capability is present in the workstation.

For providing the selectable setting of the IPL source indicator, the initialization control logic is preferably arranged to detect when a default IPL interrupt vector (preferably the interrupt 'Hex 18' vector) has been overwritten by a network adapter with remote IPL capability. When this has occurred, the initialization control logic saves the content of the default interrupt vector and replaces the content thereof with the address of logic for setting the IPL source indicator.

Preferably, the non-volatile read/write storage is CMOS memory, the initial program load (IPL) determinator being a single bit held at a location address hexadecimal (Hex) 13 in CMOS memory. The IPL source indicator is preferably implemented as a single bit held at location address Hex 011A in the extended BIOS data area.

The computer workstation can be in the form of a medialess, but upgradeable personal computer.

The invention also provides a computer network (e.g. a LAN) comprising a network server and at least one computer workstation as defined above.

In order to ensure that the network administrator is able to determine the IPL source for workstations connected to the network, the IPL determinator bit is preferably only changeable by means of an operating system independent network utility which is resident on the network server.

In accordance with a second aspect of the invention, there is provided, a method of initialising a computer workstation having non-volatile read/write storage, workstation random access memory (RAM) and permanently resident initialization control logic; the method comprising the steps, on powering on the computer workstation, of:

a) interrogating an initial program load (IPL) determinator to determine a source of IPL control logic, the IPL determinator being held at a predetermined location in non-volatile read/write storage;

b) setting, at a predetermined location within a reserved data area of the workstation RAM, an IPL source indicator; and c) passing control to the IPL control logic for causing initial programs to be loaded into the workstation RAM from the IPL source.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
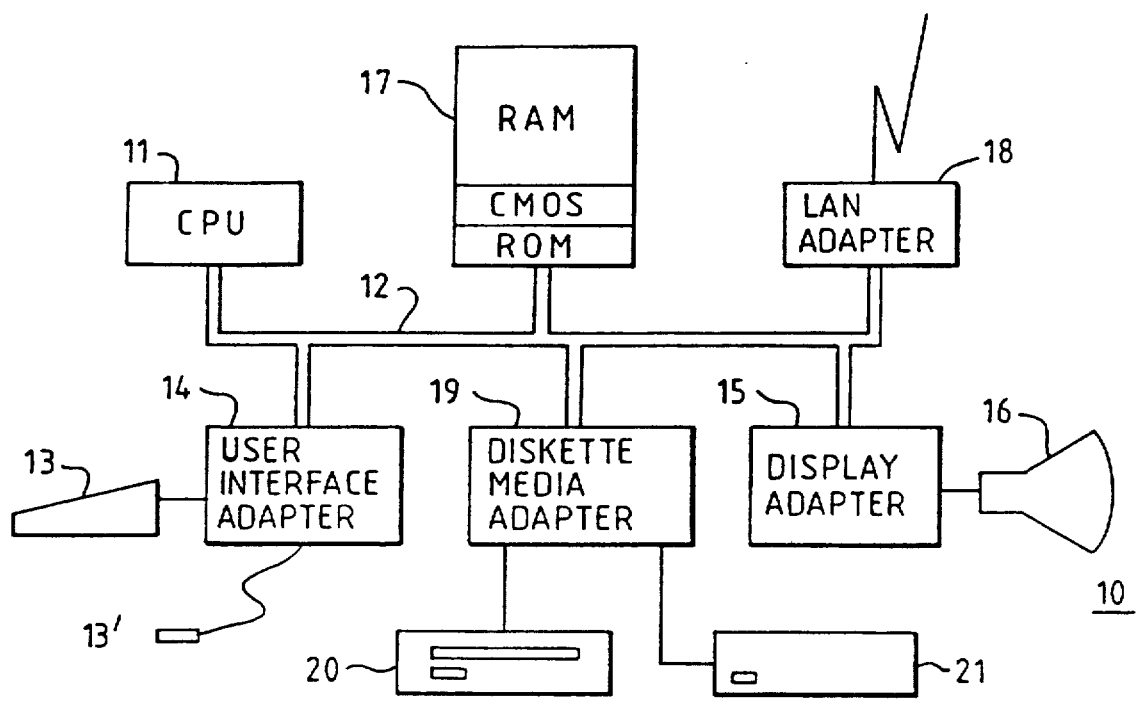
FIG. 1 is a schematic block diagram of a typical computer workstation for use with a Local Area Network.

FIG. 1 is a schematic block diagram of a typical computer workstation 10 in the form of a personal computer. The workstation is comprised of a central processing unit 11 in the form of a conventional microprocessor connected to a number of other units via a system bus 12. A keyboard 13 and other user input devices such as a mouse 13' can be connected to the system bus via a user-interface adapter 14. A display adapter 15 is provided for controlling the display of data on a display device 16.

The workstation memory 17 is also connected to the system bus. The bulk of this memory is volatile random access memory (RAM). However, it also contains some non-volatile read/write memory in CMOS technology and some Read Only Memory (ROM). It is shown in FIG. 1 as contiguous memory, as it is normally addressed in this way. However, it should be appreciated that FIG. 1 is purely schematic, and separate parts of the memory can be separately connected to the system bus.

When the workstation is to be configured for connection to a LAN, a LAN adapter 18 is provided. The workstation is also shown to comprise a internal diskette media adapter 19 for connecting the system bus to internal diskette drives such as a floppy-disk drive 20 and/or a hard-disk drive 21. When the workstation is configured for use with a LAN, then these local diskette media are optional, as the LAN servers can provide the storage functions provided by the local media in a stand-alone computer configuration. If the computer workstation is to be configured as a stand alone computer workstation (i.e. with no LAN or external computer support) then the LAN adapter is not required, but some local large capacity storage media such as one or more disk drives would be needed.

Other adapters can also be provided for connecting other devices to the system bus. For example, an adapter could be provided for connecting the workstation to other types of communications media, for example for a direct connection to a mainframe computer system. Also, a printer adapter (not shown) could likewise be provided for connecting a printer to the system bus. In each case the adapter could be incorporated on the computer's motherboard, or can be provided in the form of an add-on adapter card as appropriate.

Figure 2:
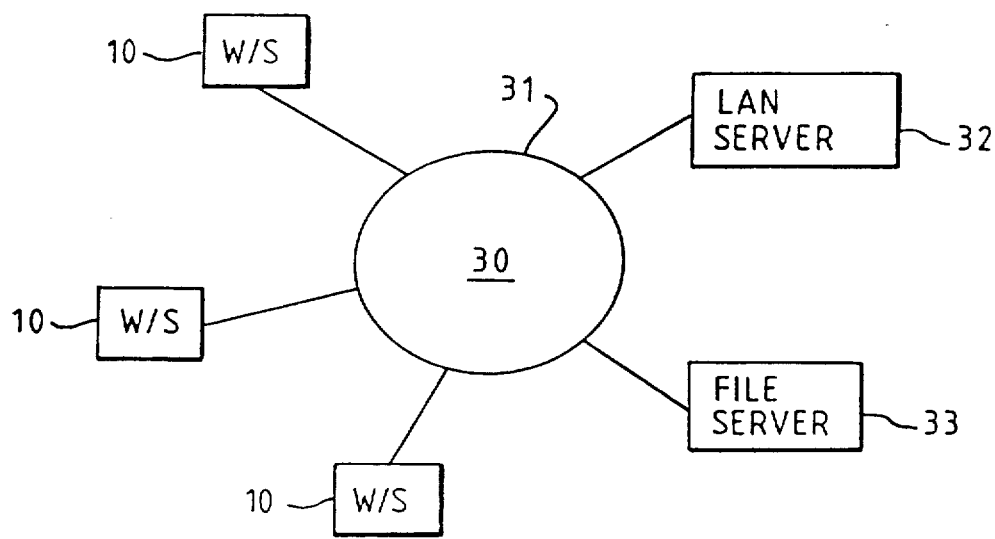
FIG. 2 is a schematic overview of typical Local Area Network.

FIG. 2 is a schematic overview of a typical LAN 30. As shown, the LAN comprises a communication medium 31, a LAN server 32, which controls the LAN, a file server 33 which controls the storage of files and a plurality of workstations such as the workstation 10. The individual workstations 10 need not have identical configurations, but can be adapted to individual requirements. However, a LAN adapter will be required to connect the workstations to the LAN.

Figure 3:
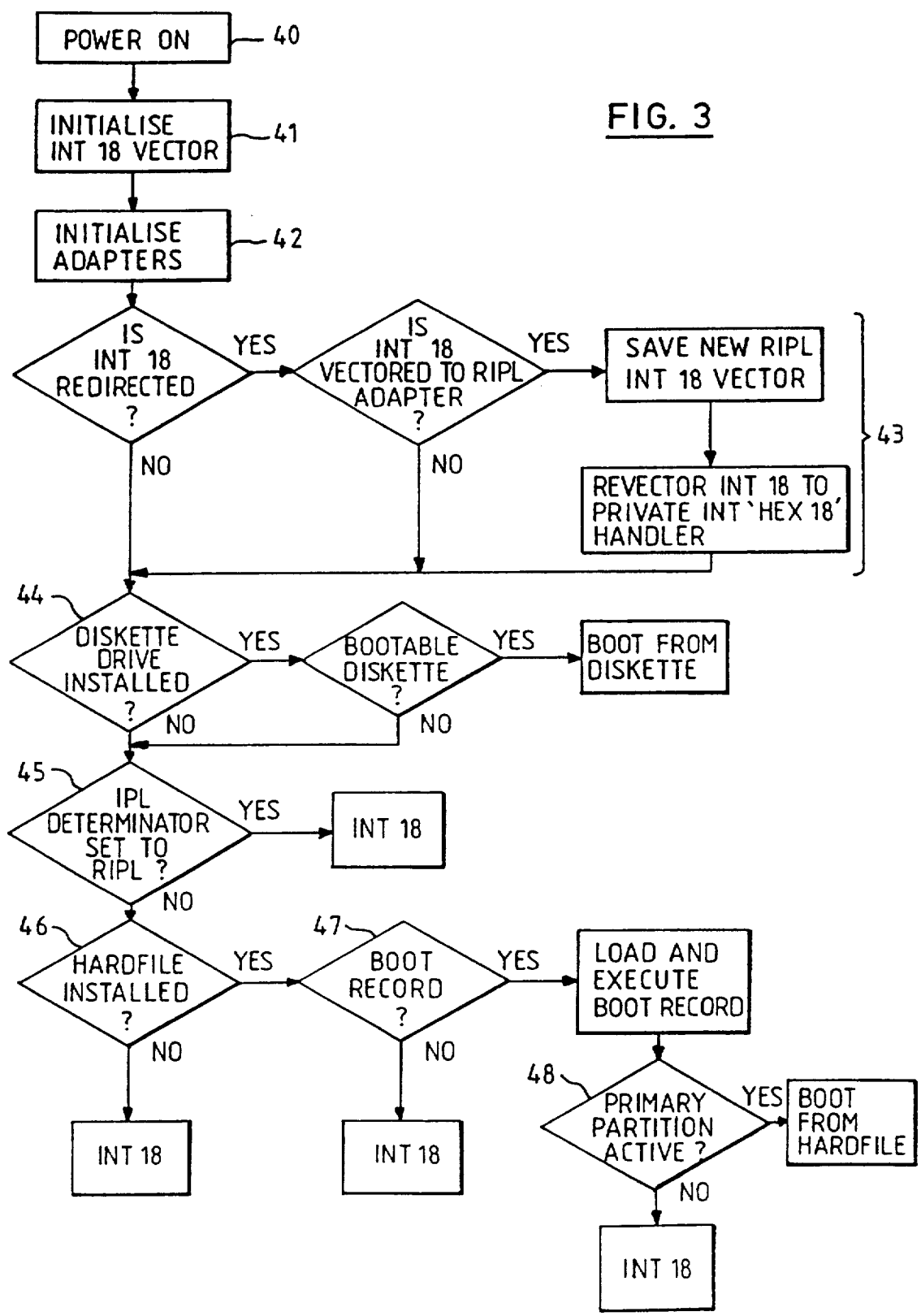
FIG. 3 is a flow diagram showing control logic for implementing the present invention.
Figure 4:
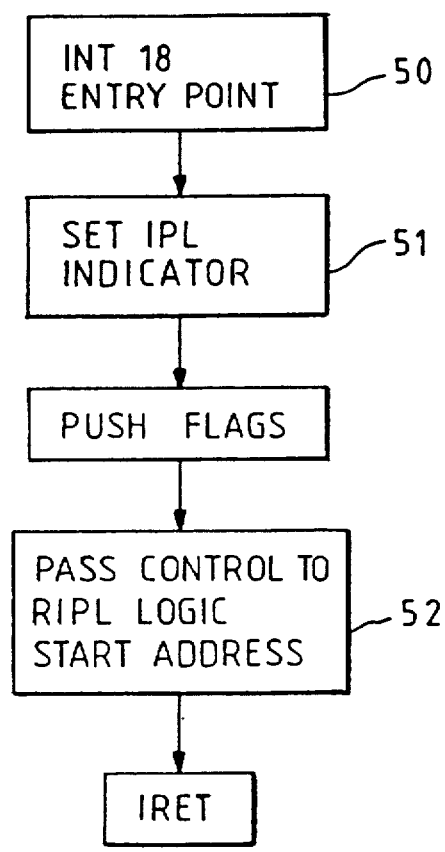
FIG. 4 is a flow diagram showing further control logic for implementing the present invention.

The initialization of a workstation such as the workstation 10 will be described with reference to the flow diagrams in FIGS. 3 and 4. On powering up the workstation, Power On Self Test (POST) code, which is stored in the workstation ROM, operates as illustrated by the flow diagram in FIG. 3. FIG. 4 illustrates a private interrupt handler for enabling the setting of a IPL indicator to reflect the IPL source.

The steps in the logical flow diagram of FIG. 3 will now be described, referring to the reference numerals as appropriate.

40—When the workstation is switched on, it executes the Power On Self Test (POST) diagnostics which tests all devices in a conventional manner.

41—During the initial, conventional POST processing, the interrupt 'Hex 18' vector is set up to point to the Personal Computer's BASIC Read Only Memory.

42—POST also initialises all installed adapters including any LAN adapters. If a LAN adapter with Remote IPL (RIPL) capability is present, the initialization of the adapter will, as normal, cause the interrupt 'Hex 18' vector to be overwritten with the start address for the RIPL logic of its own on-board RIPL ROM.

43—POST compares the contents of the interrupt 'Hex 18' vector with the workstation's hardcoded BASIC Read Only Memory address. If the interrupt 'Hex 18' vector has changed, POST proceeds to check whether the ROM is a RIPL ROM. If it is a RIPL ROM, POST saves the changed interrupt 'Hex 18' vector contents in location addresses Hex 011D to 0120 in the Extended BIOS data area, and writes the address of a private interrupt 'Hex 18' logic (FIG. 4) into the interrupt 'Hex 18' vector location.

In this way, POST detects whether the interrupt 'Hex 18' vector has been overwritten by a network adapter with remote IPL capability. By then replacing the content of the interrupt 'Hex 18' vector with the address of the private interrupt 'Hex 18' logic, having first saved the content of the default interrupt vector, calls to the interrupt 'Hex 18' will be intercepted to the private interrupt 'Hex 18' logic when a network adapter with remote IPL capability is present in the workstation.

44—If a local diskette drive is installed, POST checks whether a diskette with a valid boot record is present in the diskette drive. If it is, control is transferred to the diskette boot record.

45—POST checks the IPL determinator in the read/writable nonvolatile memory. The IPL determinator is a single bit in the workstation's CMOS storage, at address location 13h, bit 5. If the IPL determinator is set for Remote IPL (i.e. in the present implementation set to logical "1"), control is transferred to the remote IPL process via the private interrupt 'Hex 18' logic.

46—POST checks whether a local fixed disk is installed. If it is not installed, control is transferred to the remote IPL process via the private interrupt 'Hex 18' logic.

47—If a local fixed disk is installed, POST checks whether a fixed disk boot record is present. If it is not present, control is transferred to the remote IPL process via the private interrupt 'Hex 18' logic.

48—The boot record then proceeds to check whether a primary active partition is declared on the fixed disk. If the boot record is present, but the primary partition is deleted or corrupted, the boot record transfers control to the interrupt 'Hex 18' vector which points to the private interrupt 'Hex 18' logic.

Turning to FIG. 4, there now follows a description of the private interrupt 'Hex 18' handler. This logic is called when control is passed to the interrupt 'Hex 18' vector during the processing of FIG. 3. As before, this Figure is described referring to the reference numerals where appropriate.

50—The private interrupt 'Hex 18' logic is entered when an adapter with RIPL capability is installed in the workstation.

51—The IPL indicator is set in the Extended BIOS data area at location address Hex 011A. The IPL indicator is a single bit (specifically bit 0 at location address Hex 011A. In this embodiment the IPL indicator indicates Machine booted from a RIPL adapter if it is set to 1.

52—Control is transferred to the start address of the RIPL logic in the LAN adapter's ROM at initialization time.

Once control has transferred to the RIPL ROM logic, the RIPL ROM logic establishes the connection with a remote network server, and enables the remote IPL of the operating system in a conventional manner.

After initialization, applications running in the workstation's working memory or on the LAN server can check on the source of the IPL by interrogating the IPL indicator at the location address Hex 011A in the Extended BIOS data area.

In this way, even if the determinator is changed in preparation for a subsequent session, the indicator will reliably reflect the source of IPL for the current session.

Although a particular embodiment of the present invention has been described, it will be appreciated that many additions and modifications are possible within the scope of the appended claims.

For example, although in the example of the invention described above, the POST code, (i.e. the initialization control logic) is held in ROM, it could be implemented, at least in part, in the form of special purpose hardware logic. Also, although in the above embodiment the IPL determinator is held in non-volatile CMOS memory, it could be held in another type of non-volatile read/write memory, or in a special purpose read/writable register.

The present invention is particularly suited for, but not limited to a workstation for incorporation in a LAN. The specific example described above relates to a workstation for connection to a LAN in which the default IPL source is the remote LAN server. It will be appreciated, however, that the invention is equally applicable to a situation where it is intended that the default IPL source is the local diskette media within the workstation, and that the invention is not limited to workstations for connection to a LAN.

What is claimed is:
1. A computer comprising:
  a central processing unit,
  a network adapter having the capability of enabling initial program load from a location remote from the computer and operatively interconnected with said central processing unit;
  non-volatile read/write memory for storing data at a range of storage locations and operatively interconnected with said central processing unit;
  an initial program load (IPL) determinator held at a predetermined location in said non-volatile read/write memory for indicating the source of initial program load instructions to be executed by said central processing unit, said IPL determinator normally having a default initial program load interrupt vector;
  read only memory for nonvolatile storage of data at a range of storage locations and operatively interconnected with said central processing unit;

permanently resident initialization control code held at a predetermined location in said read only memory and being operable for setting the IPL determinator only when said network adapter is present; and random access memory for storing data at a range of storage locations and operatively interconnected with said central processing unit;

said initialization control code being operable with said central processing unit at power on of the computer (a) for detecting whether said default initial program load interrupt vector has been overwritten by a network adapter with remote initial program load enabling capability and, when such overwriting is detected, saving the content of the default interrupt vector and replacing it with the address of the initial program load control instructions, and (b) for interrogating said non-volatile read/write memory and determining from the initial program load determinator the source of initial program load control instructions, and (c) for setting at a predetermined location within said random access memory an initial program load source indicator indicative of the source from which initial program load instructions are to be drawn, and (d) for passing control of the computer to initial program load instructions stored at the indicated source.

2. A computer according to claim 1 wherein said non-volatile read/write memory is CMOS memory.

3. A computer according to claim 2 wherein the initial program load determinator is held at a location address Hex 13 in said CMOS memory.

4. A computer according to claim 1 wherein the initial program load determinator is a single bit.

5. A computer according to claim 1 wherein the predetermined location within said random access memory at which the initial program load source indicator is set is an extended BIOS data area.

6. A computer according to claim 5 wherein the initial program load source indicator is held at a location address Hex 011A in the extended BIOS data area.

7. A computer according to claim 1 wherein the initial program load source indicator is a single bit.

8. A computer according to claim 1 in the form of a medialess personal computer.

9. A computer network comprising:
a network server computer; and
a workstation computer operatively connected with said server computer and comprising:
a central processing unit;
a network adapter having the capability of enabling initial program load from a location remote from the computer and operatively interconnected with said central processing unit;
non-volatile read/write memory for storing data at a range of storage locations and operatively interconnected with said central processing unit;
an initial program load (IPL) determinator held at a predetermined location in said non-volatile read/write memory for indicating the source of initial program load instructions to be executed by said central processing unit, said IPL determinator normally having a default initial program load interrupt vector;
read only memory for nonvolatile storage of data at a range of storage locations and operatively interconnected with said central processing unit;
permanently resident initialization control code held at a predetermined location in said read only memory and being operable for setting the IPL determinator only when said network adapter is present; and random access memory for storing data at a range of storage locations and operatively interconnected with said central processing unit;

said initialization control code being operable with said central processing unit at power on of the computer (a) for detecting whether said default initial program load interrupt vector has been overwritten by a network adapter with remote initial program load enabling capability and, when such overwriting is detected, saving the content of the default interrupt vector and replacing it with the address of the initial program load control instructions, and (b) for interrogating said non-volatile read/write memory and determining from the initial program load determinator the source of initial program load control instructions, and (c) for setting at a predetermined location within said random access memory an initial program load source indicator indicative of the source from which initial program load instructions are to be drawn, and (d) for passing control of the computer to initial program load instructions stored at the indicated source.

10. A computer network according to claim 9 and further comprising operating system independent network utility code resident in said network server for setting and resetting the initial program load determinator in said workstation computer.

11. A computer network according to claim 9, wherein said network is a local area network.

12. A method of initializing a computer workstation having non-volatile memory, workstation random access memory, workstation read only memory, and permanently resident initialization control code; the method comprising computer implemented steps of, at powering on the workstation;

interrogating an initial program load determinator held at a predetermined location in the non-volatile read/write memory to determine the source of initial program load instructions;

responding to the interrogation by setting, at a predetermined location within a reserved data area of workstation random access memory an initial program load source indicator only where a network adapter with the capability of enabling remote initial program load is present in the workstation by detecting whether a default initial program load interrupt vector has been overwritten by a network adapter with the capability of enabling remote initial program load and responding to the detection of overwriting by saving the content of the default interrupt vector and replacing the content of the default interrupt vector with the address of the initial program load source indicator, whereby the initial program load source indicator is set only where a network adapter with remote initial program load capability is present in the workstation; and then passing control of the workstation computer to initial program load instruction at a location pointed to be the initial program load source indicator for causing for causing initial programs to be loaded into the workstation random access memory from the indicated source.

* * * * *